(12) United States Patent
Doan

(10) Patent No.: US 6,921,054 B2
(45) Date of Patent: Jul. 26, 2005

(54) ERGONOMIC MOUSE

(76) Inventor: Jimmy-Quang V. Doan, 4669 N. Magnolia, #4N, Chicago, IL (US) 60640

( * ) Notice: Subject to any disclaimer, the term of this patent is extended or adjusted under 35 U.S.C. 154(b) by 0 days.

(21) Appl. No.: 10/173,685

(22) Filed: Jun. 12, 2002

(65) Prior Publication Data

US 2003/0230680 A1 Dec. 18, 2003

(51) Int. Cl.$^7$ ................................................ B43L 15/00
(52) U.S. Cl. .................................... 248/118.5; 248/118
(58) Field of Search ............................ 248/918, 118, 248/118.5, 118.3; 345/163, 167, 161

(56) References Cited

U.S. PATENT DOCUMENTS

| | | | |
|---|---|---|---|
| 5,157,381 A | 10/1992 | Cheng | |
| 5,340,067 A | 8/1994 | Martin | |
| 5,404,591 A | 4/1995 | Brinnand | |
| 5,414,445 A | 5/1995 | Kaneko | |
| 5,490,647 A | 2/1996 | Rice | |
| D374,867 S | 10/1996 | Canavan | |
| 5,570,112 A | 10/1996 | Robinson | |
| 5,576,733 A * | 11/1996 | Lo ............................. | 345/163 |
| 5,581,277 A | 12/1996 | Tajiri | |
| 5,648,798 A * | 7/1997 | Hamling ...................... | 345/163 |
| D384,047 S * | 9/1997 | Edwards et al. ........... | D14/417 |
| 5,826,842 A | 10/1998 | Paulse | |
| 5,845,884 A | 12/1998 | Terbrack | |
| 5,870,081 A * | 2/1999 | Wu ............................. | 345/163 |
| 5,913,497 A | 6/1999 | Myers | |
| 5,944,289 A | 8/1999 | Speece | |
| 5,990,871 A * | 11/1999 | Adams et al. ............... | 345/167 |
| 6,005,553 A | 12/1999 | Goldstein | |
| 6,064,371 A | 5/2000 | Bunke | |
| 6,097,371 A | 8/2000 | Siddiqui | |
| 6,157,370 A | 12/2000 | Kravtin | |
| 6,300,941 B1 | 10/2001 | Segalle | |
| 6,304,249 B1 | 10/2001 | Derocher | |
| 6,362,811 B1 | 3/2002 | Edwards | |
| 6,377,245 B1 * | 4/2002 | Park ............................ | 345/163 |
| 6,396,478 B1 * | 5/2002 | Kravtin et al. ............... | 345/163 |
| 6,431,504 B1 * | 8/2002 | Ignagni ...................... | 248/118.5 |
| 6,433,779 B1 * | 8/2002 | Woolman ...................... | 345/163 |
| 6,486,868 B1 * | 11/2002 | Kazarian ...................... | 345/156 |
| 6,489,947 B2 * | 12/2002 | Hesley et al. ................ | 345/163 |

* cited by examiner

Primary Examiner—Leslie A. Braun
Assistant Examiner—A. Joseph Wujciak
(74) Attorney, Agent, or Firm—P. Derek Pressley

(57) ABSTRACT

A computer mouse having a separately movable hand rest. The mouse comprises a housing having a conically shaped depression within a top wall of the housing tapering to an aperture through the top wall. A connecting pin extends through the aperture with an interior end secured within the mouse housing. A hand rest providing support to the heel and palm of the hand is orbitally connected to the connecting pin by an aperture through the hand rest located within a concave portion sized to fit within the depression of the mouse housing. The hand rest has an arcuate shaped bottom portion and a base end moving about the mouse housing during use to maintain alignment of the hand rest with the hand. The housing moves free of interference from the hand rest adjacent the arcuate shaped bottom portion. A tensioning means tensions movement of the hand rest about the housing.

11 Claims, 9 Drawing Sheets

ERGONOMIC MOUSE

BACKGROUND OF THE INVENTION

1. Field of the Invention

The present invention generally relates to computer mice. More specifically, the present invention relates an ergonomic computer mouse having a separately movable hand rest.

2. Description of the Prior Art

Computers have become increasingly more important in the everyday life of most people and very few are not affected in one way or another by computers processing information concerning the world around us. Computers have become an essential tool to many different occupations and professions where people use computers for long periods of time to transact business. As we increasingly rely on computers in the office as well as in the home, the debilitating physical effects of prolonged use of computer mice have become apparent.

Most desktop computer software rely on "point and click" operations. Hand-operated pointing devices with buttons are commonly used to manipulate computer displays and make selections. While many different devices have been developed to facilitate use of computer software such as trackballs or touch pads, the computer mouse is by far the most popular. In order to make the use of computers more user friendly, many different types of computer mice have been created to provide a more ergonomically correct computer interface.

Although computer mice may differ in their exact style and appearance from one manufacturer to another, their functions and methods of use are very similar. To communicate with the computer, the computer user must move the mouse and click selection buttons to manipulate the computer software. This repetitive moving and clicking of the computer mouse, as well as other activities associated with using the mouse, can cause tendinitis and other types of hand, wrist, and arm pain, referred to in general as Repetitive Stress Injuries (RSIs) or Cumulative Trauma Disorders (CTDs). Once the pain is present, a vicious cycle of use-pain-stop use/use-pain-stop use often begins and computer use becomes difficult. One of the more damaging types of repetitive motions is the continual flexion and extension of the middle finger, as might be caused by clicking the mouse button. Constant flexion and extension of the middle finger causes activation of the extensor carpi radialus brevis muscle and may cause subsequent impingement and irritation of the radial nerve.

Many of the computer mice created to date have been designed to provide static ergonomic support by contouring the outer surface of the mouse housing to orient the user's hand in an ergonomically correct position. However, the mice created to date do not provide ergonomic support that is dynamic to compensate for the movements of the user's hand during use of the mouse. Several of these mice are discussed here.

U.S. Pat. No. 6,157,370 issued to Kravtin et al. discloses a conventional computer mouse in combination with an ergonomic extension. The ergonomic extension is attached to the computer mouse for movement therewith and is positioned adjacent to the computer mouse for facilitating use of the mouse by a user in a ergonomically correct position. An adjustment mechanism enables the user to adjust the position of the computer mouse relative to the ergonomic extension for enabling use of the computer mouse and ergonomic extension by users having different size hands.

A drawback to this particular type of computer mouse design is the fact that the ergonomic extension does not move in relation to the computer mouse during use. Due to this limitation, the alignment of the user's hand with the ergonomic extension may not be maintained in an ergonomically desirable position. Therefore, there still remains a need for a computer mouse that dynamically supports the heel and palm of the hand while still allowing the computer mouse to rotate and translate freely in relation to the heel and palm support.

Similarly, U.S. Pat. No. 6,064,371 issued to Bunke et al. discloses an ergonomic computer mouse having support surfaces that are adjustable in two directions. The mouse includes a pivot mechanism that couples an upper and lower portion of the mouse housing together. The pivot mechanism may allow a user to adjust the upper and lower housing portions in pitch and roll directions with respect to one another. This computer mouse also does not provide dynamic ergonomic support to a user's hand when the user moves the centerline of the computer mouse out of alignment with the centerline of the user's hand and wrist.

U.S. Pat. No. 5,944,289 issued to Speece discloses an ergonomic wrist rest for a user of a computer mouse input device. The rest is adapted to receive the arm of the user, extending to the user's wrist for maintaining the user's hand in a predetermined position with respect to the arm of the user when the fingers of the user contact the mouse input device. This ergonomic wrist rest retains the hand and wrist of the user in a predetermined position so that the centerline of the user's hand and wrist is held in line with the centerline of the computer mouse. However, this type of design can be rather restrictive and uncomfortable and requires a greater amount of desktop space to accommodate the rest. Therefore, a new approach is needed for providing dynamic ergonomic support to a user's hand.

U.S. Pat. No. 6,304,249 issued to Derocher et al. discloses a computer mouse that collapses into a smaller form. In one embodiment, a cover slides to hide or reveal buttons and collapses or extends the length of the mouse. This computer mouse is another example of a mouse designed to adjustably accommodate different situations, but does not provide dynamic ergonomic support to a user's hand.

These prior art devices, as well as devices that are not expressly discussed here, disclose providing static support to the heel and palm of the hand during use of a computer mouse but do not disclose, teach, or suggest how to compensate for movement of the heel and palm of a user's hand during movement of the computer mouse and hand in relation to the static support. Therefore, there is still a need for an ergonomic computer mouse having dynamic ergonomic support for the heel and palm of a user's hand during use of the computer mouse.

SUMMARY OF THE INVENTION

To provide a solution to the foregoing problems of the prior art, as well as others that will become evident upon the reading of the detailed description of the preferred embodiment and viewing the drawings contained herein, the claimed invention provides an ergonomic computer mouse having a separately movable hand rest.

A primary objective of the claimed invention is to provide an ergonomic computer mouse having dynamic ergonomic support for a user's hand during use of the computer mouse.

Another objective of the claimed invention is to provide an ergonomic computer mouse with multiple moving body sections, yet still having a simplified design.

A further objective of the claimed invention is to provide an ergonomic computer mouse having a hand rest that elevates the heel of the hand above the surface on which the computer mouse moves.

An even further objective of the claimed invention is to provide an ergonomic computer mouse that reduces the extension of the hand in relation to the wrist so that the hand is placed in a substantially neutral position during use of the ergonomic computer mouse.

A still further objective of the claimed invention is to provide a method of dynamically supporting a user's hand during use of the ergonomic computer mouse.

The ergonomic computer mouse comprises a housing having a frustroconically shaped recess within a top wall of the housing. The recess tapers to a centrally located aperture through the top wall of the housing. A connecting pin extends through the aperture having an interior end secured within the mouse housing. A hand rest providing support to the heel and palm of the hand is orbitally connected to the connecting pin by an aperture through the hand rest located within a concave portion sized and shaped to fit within the depression of the mouse housing. The hand rest has an arcuate shaped bottom portion and a base end moving about the mouse housing during use to maintain alignment of the hand rest with the hand. The mouse housing moves free of interference from the hand rest adjacent the arcuate shaped bottom portion of the hand rest. A tensioning means tensions movement of the hand rest about the housing.

BRIEF DESCRIPTION OF THE DRAWINGS

FIG. 1 shows a perspective view of the ergonomic computer mouse.

FIG. 2 shows an exploded view of the ergonomic computer mouse.

FIG. 3 shows a perspective view of the bottom section of the computer mouse housing.

FIG. 4 shows a vertical cross sectional view of the top section of the computer mouse housing.

FIG. 5 shows a top view of the top section of the computer mouse housing.

FIG. 6 shows vertical cross sectional view of the hand rest.

FIG. 7 shows a top view of the hand rest.

FIG. 8 shows a bottom view of the hand rest.

FIG. 9 shows an enlarged view of the connecting pin.

FIG. 10 shows typical placement of a user's hand upon the ergonomic computer mouse.

FIG. 11 shows a vertical cross sectional view of the ergonomic computer mouse in a neutral position.

FIG. 12 shows a vertical cross sectional view of the ergonomic computer mouse in a fully retracted position.

FIG. 13 shows a vertical cross sectional view of the ergonomic computer mouse in a fully extended position.

FIG. 14 shows the base end of the hand rest rotated to the right of the mouse housing.

FIG. 15 shows the base end of the hand rest rotated to the left of the mouse housing.

DETAILED DESCRIPTION OF THE PREFERRED EMBODIMENT

Figure 1:
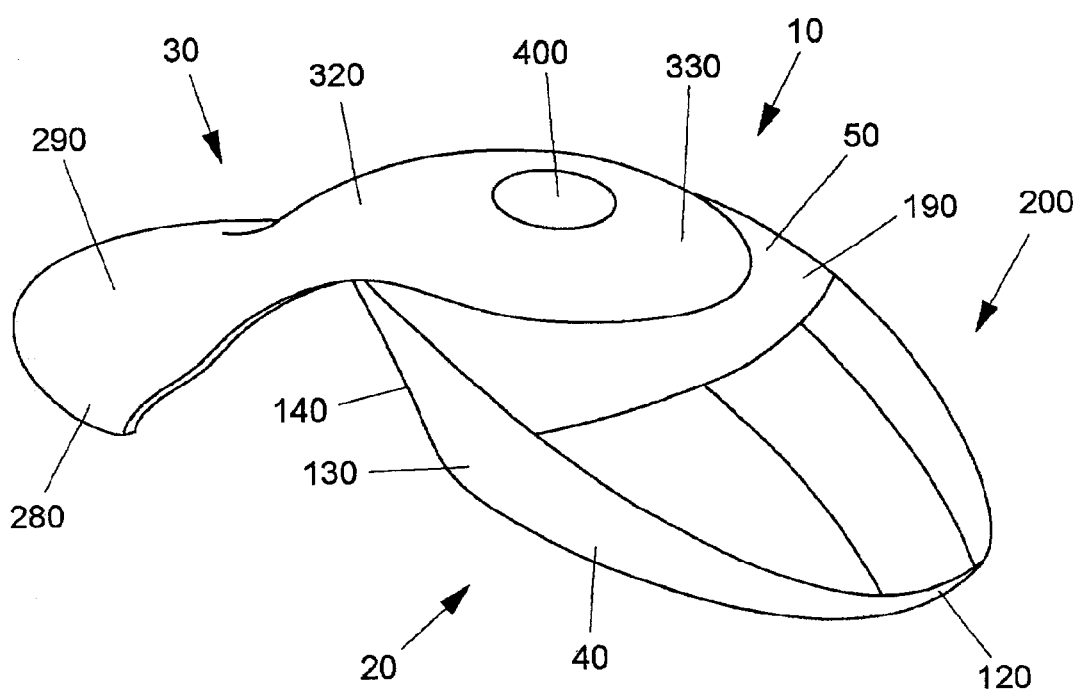
FIG. 1.
Figure 2:
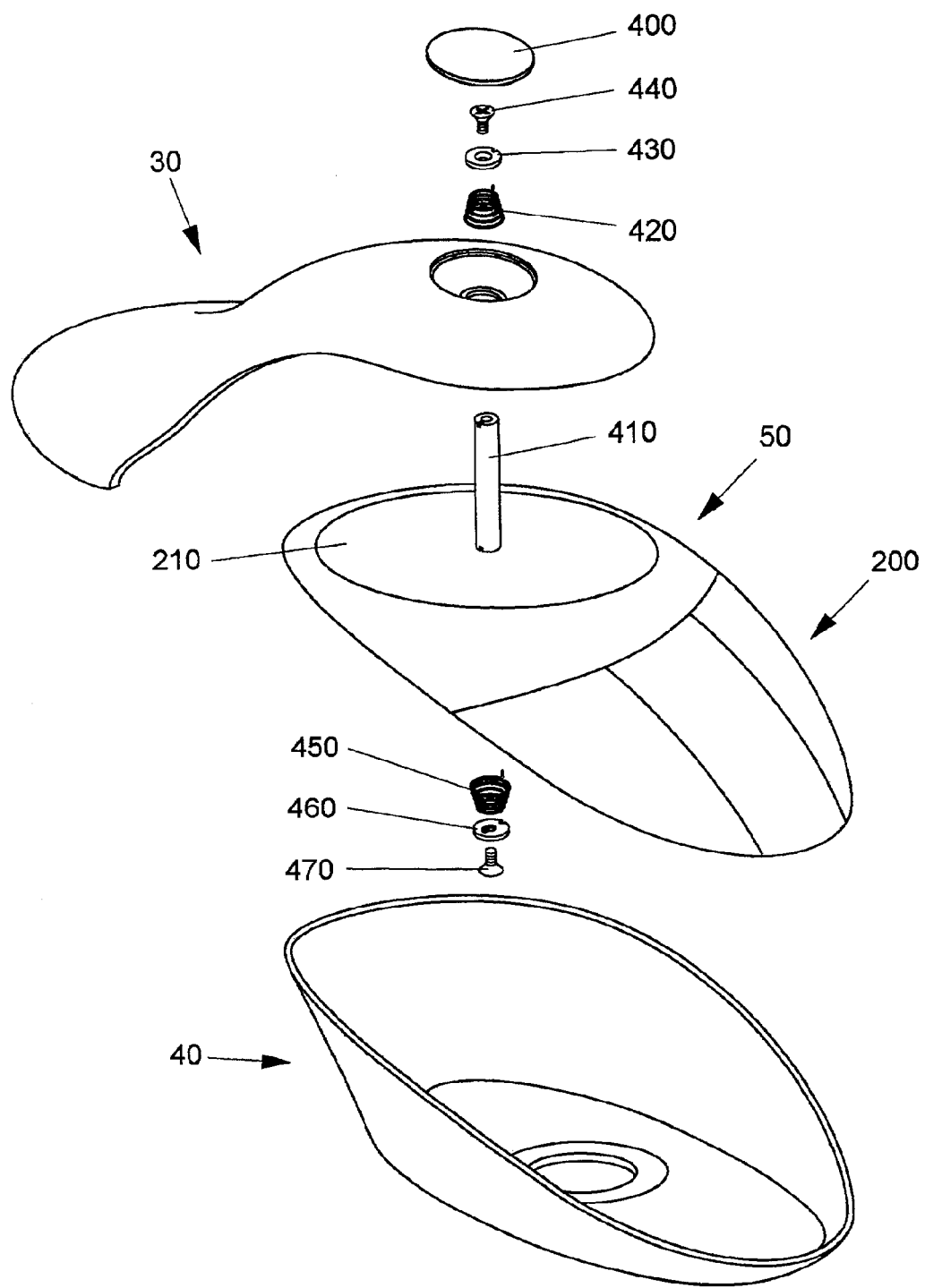
FIG. 2.

Turning now to the drawings, a preferred embodiment of the claimed invention is shown in FIGS. 1 and 2. The internal components and functions of the ergonomic computer mouse 10 are essentially the same as a standard computer mouse such as those described and referenced in U.S. Pat. No. 6,097,371. The claimed invention presents an improved ergonomic computer mouse 10 having multiple moving body part sections to provide dynamic ergonomic support during use. The overall shape of the computer mouse housing 10 and hand rest 30 are designed to create a combined dynamic ergonomic surface to support a user's hand during use of the ergonomic computer mouse 10. The ergonomic computer mouse 10 shown in FIG. 2 generally consists of a computer mouse housing 20 having a bottom section 40 and a top section 50 with interior space for internal electronic components and an ergonomic hand rest 30 orbitally connected to the housing 20 by a connecting pin type connector assembly 60.

Figure 3:
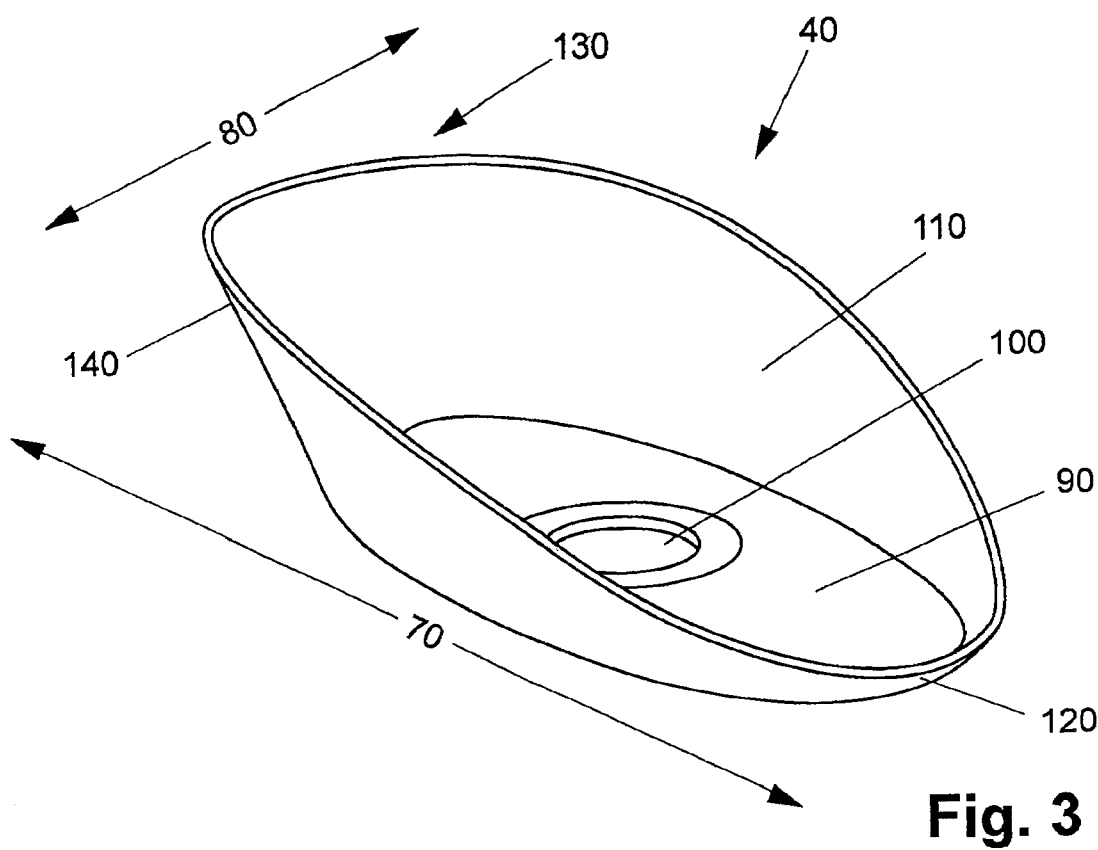
FIG. 3.

The bottom section 40 of the computer mouse housing is sized similar to existing computer mice with the overall length 70 of the bottom section 40 shown in FIG. 3 preferably being about 4.10 inches and the overall width 80 being about 2.50 inches. The bottom wall 90 of the bottom section 40 is generally flat and has features similar to existing computer mice such as an aperture 100 for the rotating ball of the computer mouse to extend through and detail for securing the rotating ball within the computer mouse housing 20. The height of the side walls 110 of the bottom section 40 increase from about 0.19 inches at the front end 120 to about 1.30 inches at the back end 130 so that the bottom section 40 has an inclined profile from the back end 130 to the front end 120. The back wall 140 of the bottom section 40 generally angles out from the bottom wall 90 of the bottom section 40 so that the back end 130 of the computer mouse housing 20 does not interfere with movement of the mouse housing 20 with respect to the hand rest 30 during use. The inclined profile of the bottom section 40 is designed to cooperate with the design of the hand rest 30 to form a dynamic ergonomic computer mouse 10 where the overall shape of the ergonomic computer mouse 10 holds the user's hand 150 in a neutral position when the user's hand 150 is placed upon the ergonomic computer mouse 10 as shown in FIG. 10.

Figure 4:
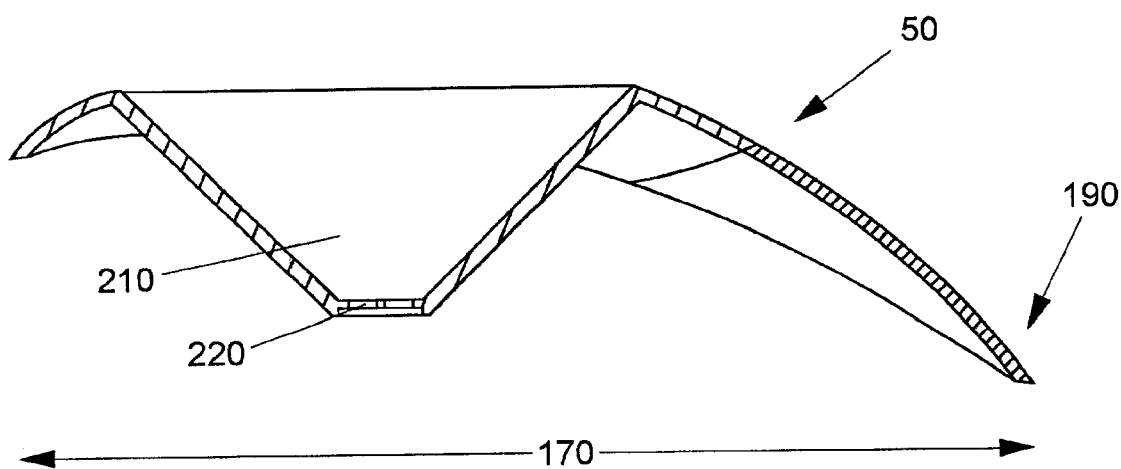
FIG. 4.
Figure 5:
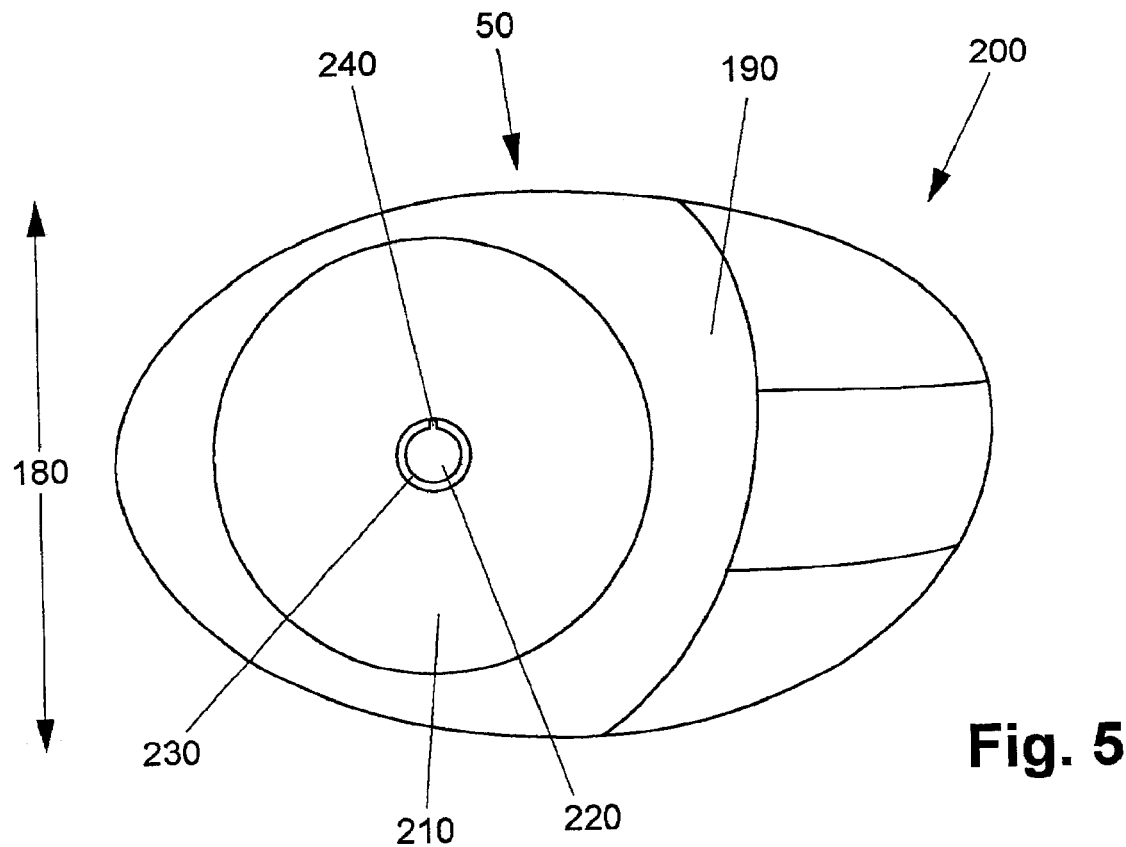
FIG. 5.

The top section 50 of the computer mouse housing 20 is sized similar to existing computer mice with the overall length 170 of the top section 50 shown in FIGS. 4 and 5 preferably being about 4.1 inches including the mouse buttons 200. The overall width 180 of the top section 50 is about 2.50 inches. The front end 190 of the top section 50 can be variously configured to compliment mouse button configurations 200 of different types such as, but not limited to two button configurations, three button configurations, and two and three button configurations in combination with a selector wheel. The curvature of the front end 190 of the top section 50 is configured to provide a transition from the curvature of the hand rest 30 to the curvature of the mouse buttons 200 as shown in FIG. 4.

Figure 11:
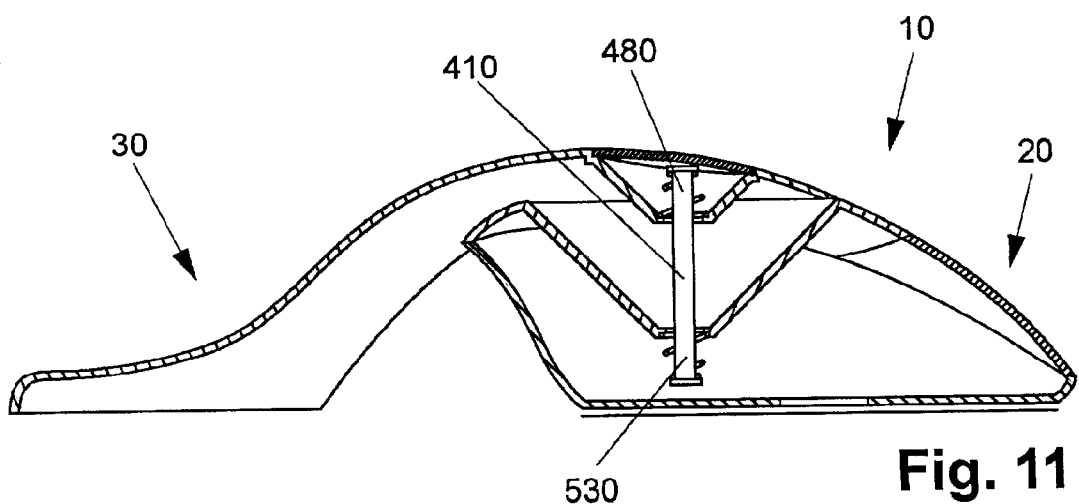
FIG. 11.
Figure 12:
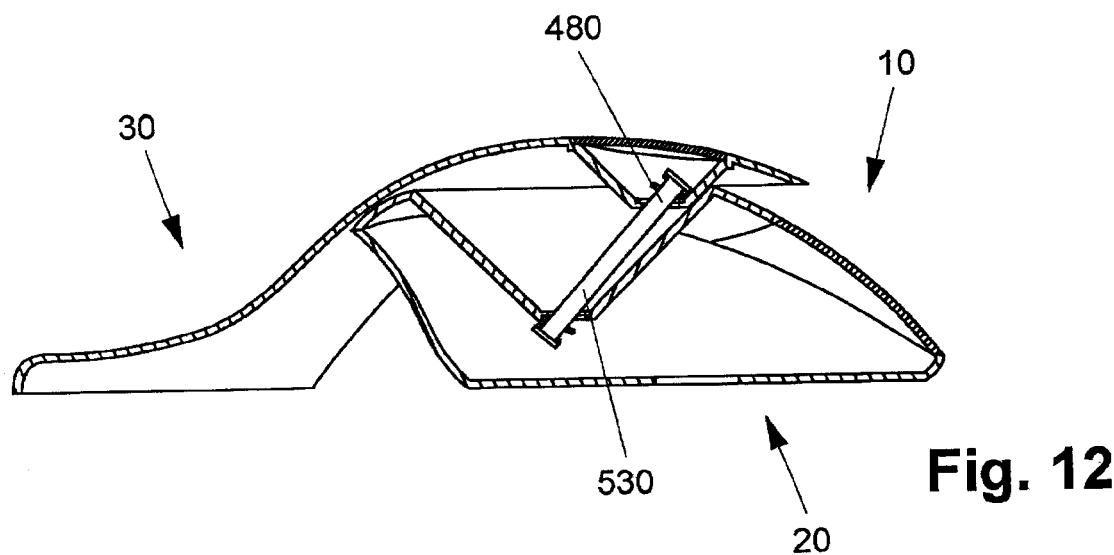
FIG. 12.
Figure 13:
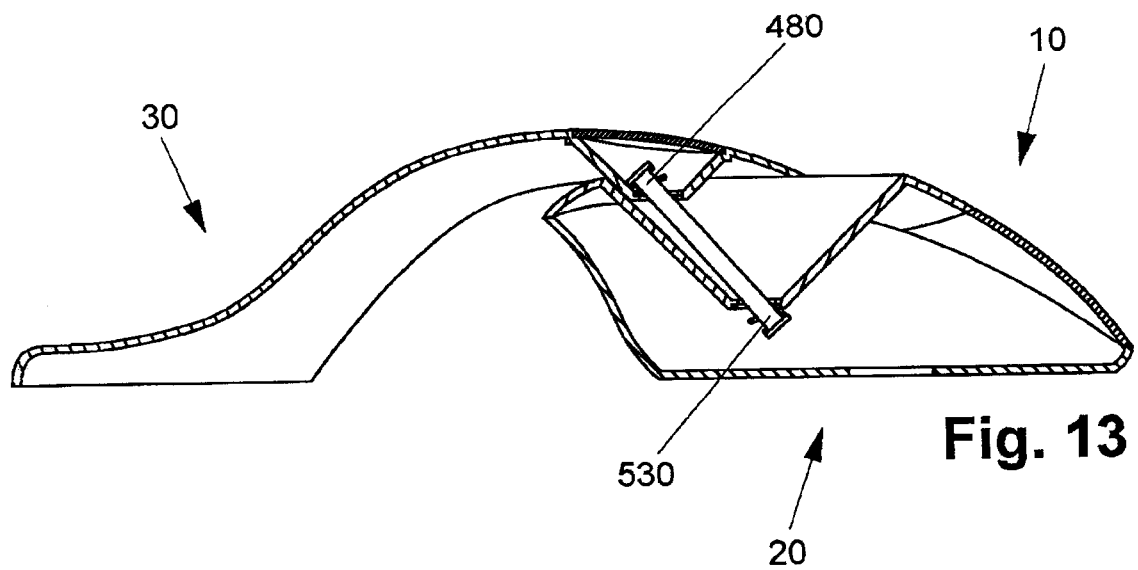
FIG. 13.

A frustroconically shaped recess 210 is centrally located within the top section 50 of the mouse housing 20 to provide clearance for the interaction of the connector assembly 60 with the top section 50 and the hand rest 30 as shown in FIGS. 11–13. Frustrum is defined by Webster's Dictionary as being "the remaining part of a solid pyramid or cone when its upper part has been cut away along a place parallel to the base." The use of the term "frustroconically shaved recess 210" is used in this specification as meaning the remaining part of a conically shaved recess where the conical tip portion has been removed by a parallel wall cutting off the conical tip. The conical recess 210 preferably tapers from about 2 inches in diameter to an aperture 220 through the top section 50 having a diameter of about 0.25 inches where the connector assembly 60 connects to the top section 50. A flat spring retention ledge 230 with a spring engagement slot 240 surrounds the aperture 220.

Figure 10:
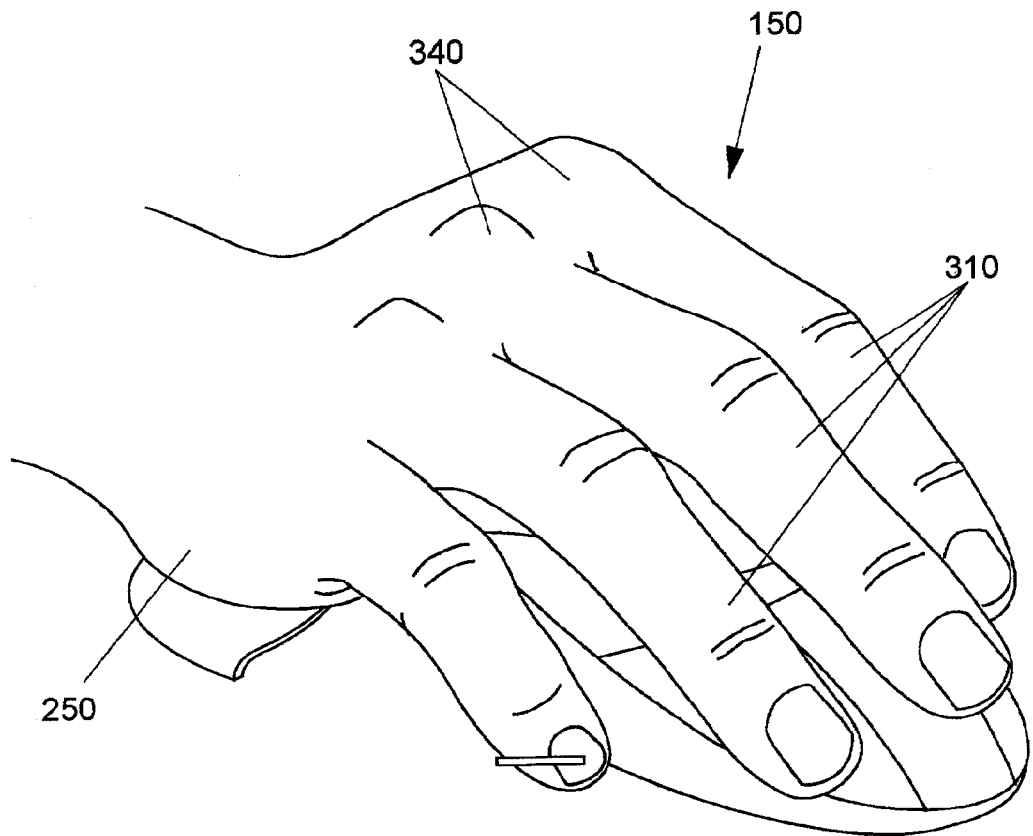
FIG. 10.

The overall design of the hand rest 30 is created to provide a surface that places the user's hand 150 in a neutral position when the user's hand is resting upon the hand rest, meaning the user's hand is not flexed, hyper-extended when placed upon the ergonomic computer mouse as shown in FIG. 10. This neutral position posture can be demonstrated by letting the arm and hand hang relaxed at the side of the body. The ergonomic computer mouse 10 is designed to maintain this natural position by slightly elevating the heel 250 of the user's hand 150 in relation to the mouse housing 20 so that the user's hand 150 is not hyper-extended during use of the ergonomic computer mouse 10. FIG. 10 shows typical placement of a user's hand 150 upon the ergonomic computer mouse 10. Incorrect mouse posture, such as hyper-extension of the hand, can create situations that stress the hand and puts users of computer mice at risk of developing a cumulative trauma disorder due to prolonged and repetitive placement of the hand in an unnatural position such as computer mice of the prior art require.

Figure 6:
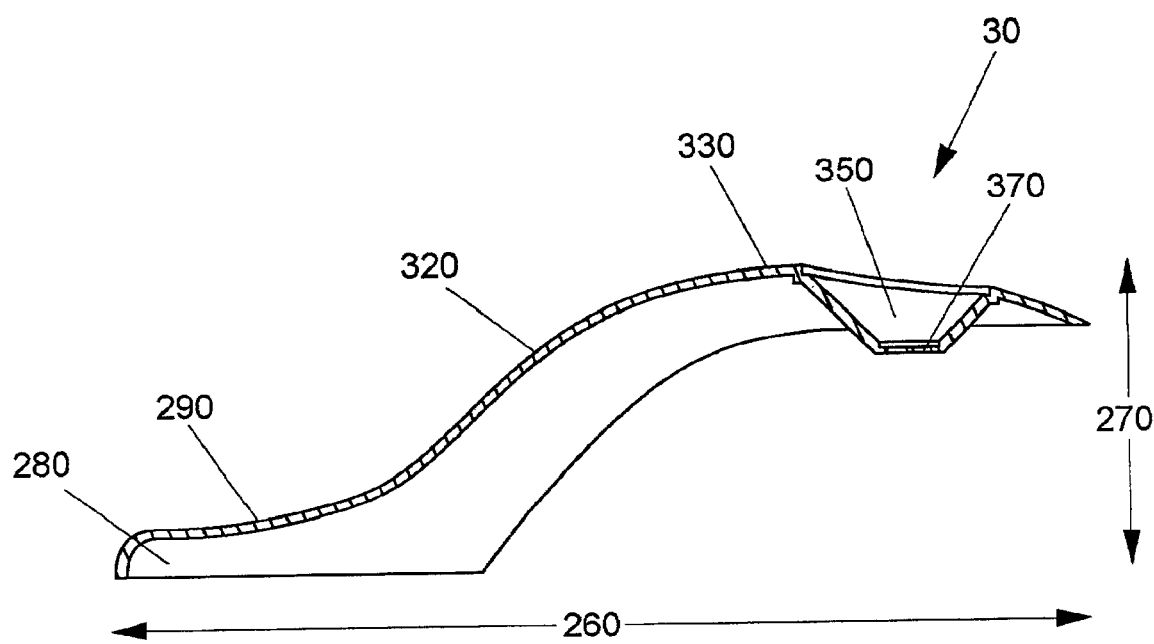
FIG. 6.
Figure 7:
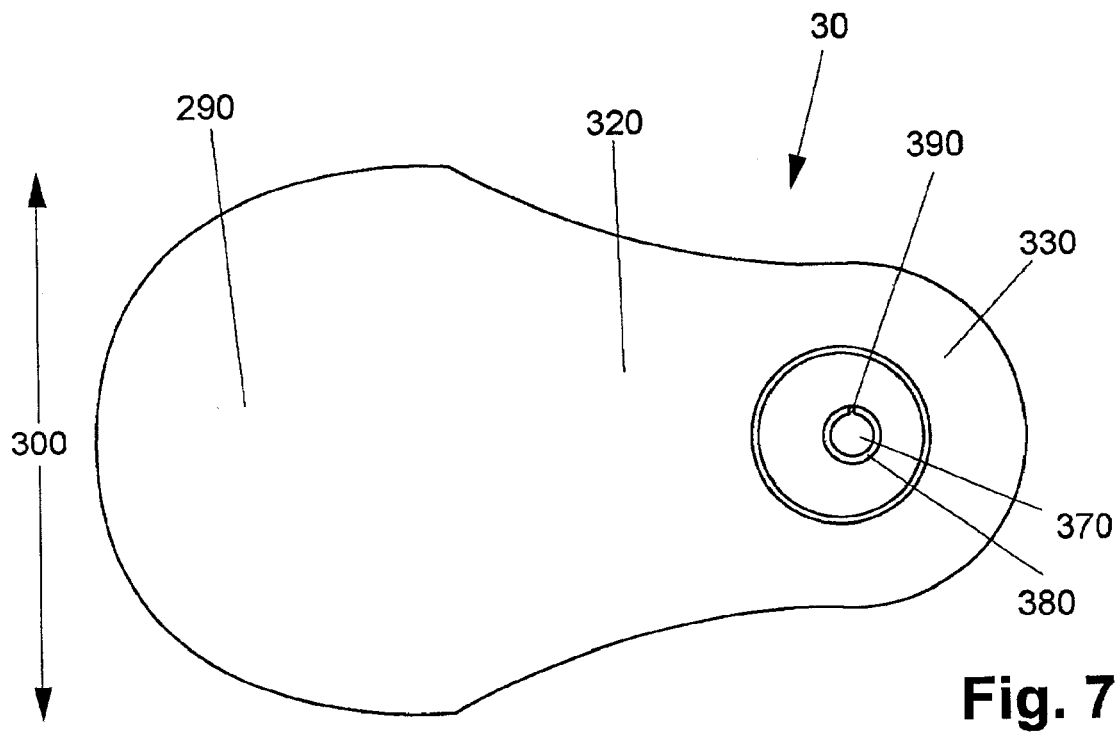
FIG. 7.
Figure 8:
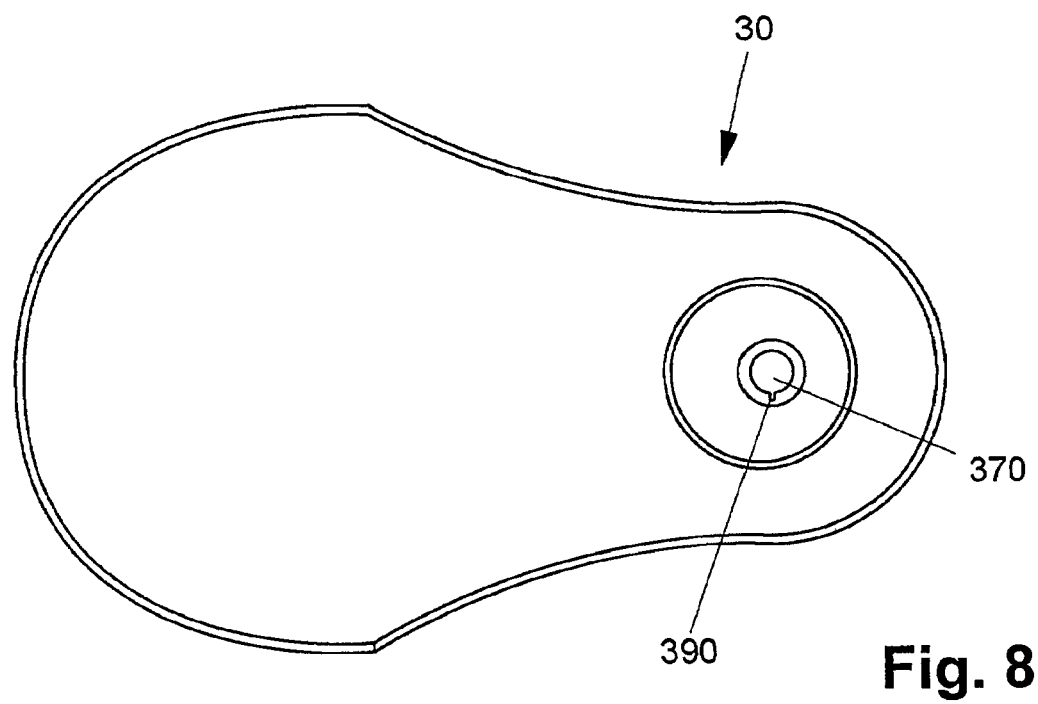
FIG. 8.

The hand rest 30 as shown in FIGS. 6–8 preferably has an overall length 260 of about 5.40 inches and an overall height 270 of about 1.65 inches. FIGS. 1 and 11–13 show that the hand rest 30 is partially superimposed over the mouse housing 20 so that the mouse housing 20 and hand rest 30 act as a unitary device. However, it is contemplated as being within the scope of the claimed invention that different sizes and shapes of hand rests may be designed to accommodate different users. The hand rest 30 shown in FIG. 6 has a base 280 comprising a lower rest portion 290 preferably having an overall width 300 of about 3.20 inches that is contoured to receive the heel 250 of the user's hand 150 as shown in FIG. 10. This allows a user to rest the user's entire hand 150 upon the ergonomic computer mouse 10 without relying upon the surface on which the mouse 10 is resting to provide support to the heel 250 of the user's hand 150. The lower rest portion 290 elevates the heel 250 of the user's hand 150 so that the hand 150 is not hyper-extended when the hand 150 is placed upon the ergonomic computer mouse 10.

One of the more damaging types of repetitive motions in using a computer mouse is the continual flexion and extension of the middle finger when clicking mouse buttons. Constant flexion and extension of the middle finger causes activation of the extensor carpi radialus brevis muscle and may cause subsequent impingement and irritation of the radial nerve. Placement of the entire hand upon the ergonomic computer mouse 10 facilitates maintaining proper spatial relationship between the heel 250 of the user's hand 150 and the buttons 200 of the computer mouse 10 so that the user's fingers 310 are properly positioned over the mouse buttons 200. By maintaining a proper relationship between the user's fingers 310 and the inclined profile of the mouse housing 20, the user can push the mouse buttons 200 with a reduced amount of flexion and extension of the fingers 310 thus reducing the possibility of irritation of the nerves in the user's hand 150.

The hand rest 30 has an inclined surface forming a middle rest portion 320 for providing ergonomic support to the palm of the user's hand 150 as shown in FIG. 10. The curvature of the middle rest portion 320 from the lower rest portion 290 maintains the placement of the user's palm in the desired neutral position when using the ergonomic computer mouse 10. The hand rest 30 terminates in an upper rest portion 330 where the knuckles 340 of the user's hand 150 may rest. The curvature of the upper rest portion 330 is designed to match the curvature of the top section 50 of the housing 20 when the ergonomic computer mouse 10 is in a neutral position as shown in FIG. 11.

A frustroconically shaped recess or well 350 is centrally located within the upper rest portion of the hand rest as shown in FIGS. 2, 6, and 7 to allow the connection of the top end 480 of the connector assembly 60 to the hand rest 30 without interfering with the placement of the user's hand 150 over the area where the connector assembly 60 connects to the hand rest 30. The conical shaped recess 350 within the upper rest portion 330 preferably tapers from about 1 inch in diameter to an aperture 370 through the hand rest 30 having a diameter of about 0.25 inches where the connector assembly 60 connects to the hand rest 30. A flat spring ledge 380 with a spring engagement slot 390 surrounds the aperture 370. A cover 400 is placed over the conical shaped recess 350 to prevent the user from interfering with the movements of the connector assembly 60 during use.

Figure 9:
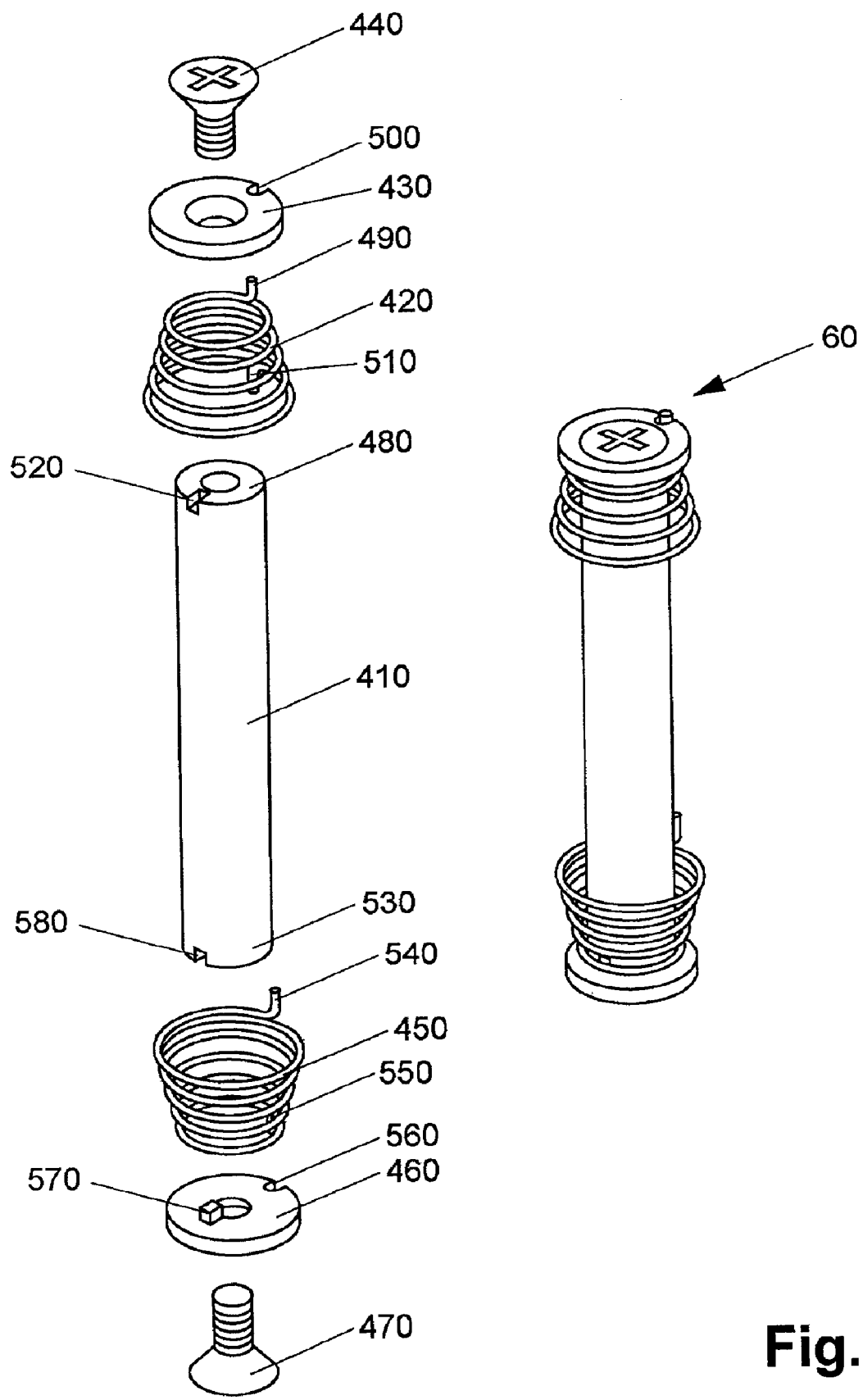
FIG. 9.

The connector assembly 60 as shown in FIGS. 2 and 9 connects the hand rest 30 to the mouse housing 20. The connector assembly 60 preferably comprises a connecting pin 410, an upper compression spring 420, an upper spring retainer 430, an upper spring retainer screw 440, a lower compression spring 450, a lower spring retainer 460, and a lower spring retaining screw 470. Alternately, elastic bands can be used to provide the function that the compression springs 420 and 450 provide in this preferred embodiment. The top end 480 of the connecting pin 410 extends through the aperture 370 of the hand rest 30 so that the upper compression spring 420 is placed about the connecting pin 410 and rests on the spring ledge 380 that surrounds the aperture 370 through the hand rest 30. The upper spring retainer 430 allows the upper spring retaining screw 440 to retain the upper compression spring 420 in place about the connecting pin 410 and against the spring ledge 380 about the aperture 370 through the hand rest 30. The top end 490 of the upper compression spring 420 engages the spring end slot 500 of the upper spring retainer 430 and the bottom end of the upper compression spring 510 engages the engagement slot 390 of the hand rest 30. The key (not shown) of the upper spring retainer 430 engages the key slot 520 of the connection pin 410.

The bottom end 530 of the connecting pin 410 extends through the aperture 220 through the top section 50 of the mouse housing 20 so that the lower compression spring 450 is placed about the connecting pin 410 and is retained against the interior face of the spring retention ledge 230 about the aperture 220 through the top section 50 of the mouse housing 20 by the lower spring retainer 460 and lower spring retainer screw 470. The top end 540 of the lower compression spring 450 engages the engagement slot 240 of the top section 50 and the bottom end 550 of the lower compression spring 450 engages the spring end slot 560 of the lower spring retainer 460. The key 570 of the lower spring retainer 460 engages the lower key slot 580 of the connection pin 410.

FIG. 11 shows a vertical cross sectional view of the ergonomic computer mouse 10 where the compression springs 420 and 450 maintain the mouse housing 20 in a neutral position with respect to the hand rest 30 aligning the aperture 370 of the hand rest 30 over the aperture 220 of the top section 50 of the mouse housing 20. As the hand rest 30 is moved out of alignment with the mouse housing 20, the connecting pin 410 moves within the recess of the top section 210 of the mouse housing 20 as the compression springs 420 and 450 gradually resist rotational and translational movement of the mouse housing 20 with respect to the hand rest 30. FIG. 12 shows a vertical cross sectional view of the ergonomic computer mouse 10 where the mouse housing 20 is fully retracted to the hand rest 30. FIG. 13 shows a vertical cross sectional view of the ergonomic computer mouse 10 where the mouse housing 20 is fully extended from the hand rest 30.

The conical shape of the recess 210 within the top section 50 allows the connecting pin 410 to move rotationally as well as translationally about the center of the aperture 220 through the top section 50 of the mouse housing 20 when the mouse housing 20 is moved with respect to the hand rest 30. The 2 inch diameter of the recess 210 within the top section 50 of the mouse housing 20 limits the movement of the connecting pin 410 to a 1 inch radius about the center of the aperture 220 through the top section 50 of the mouse housing 20. The torsional spring force of the compression springs 420 and 450 bring the connecting pin 410 back to it original position, moving the mouse housing 20 into rotational and translational alignment with the hand rest when the computer mouse 10 is not in use.

Figure 14:
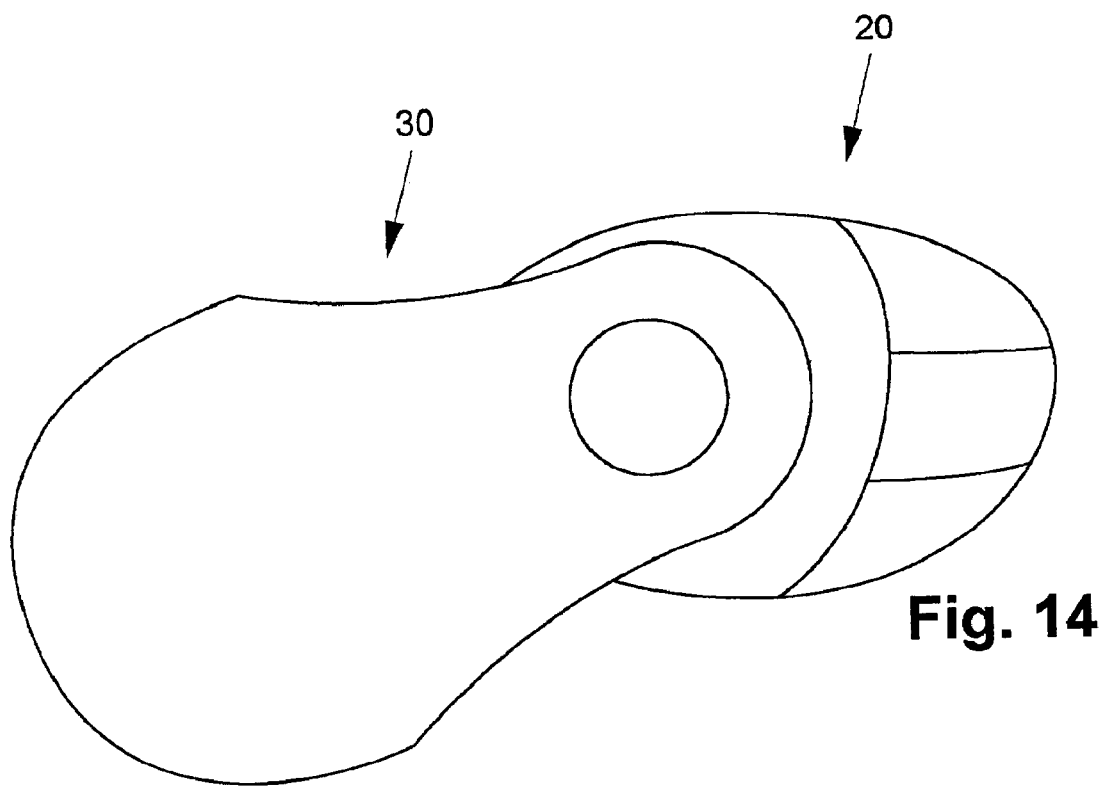
FIG. 14.
Figure 15:
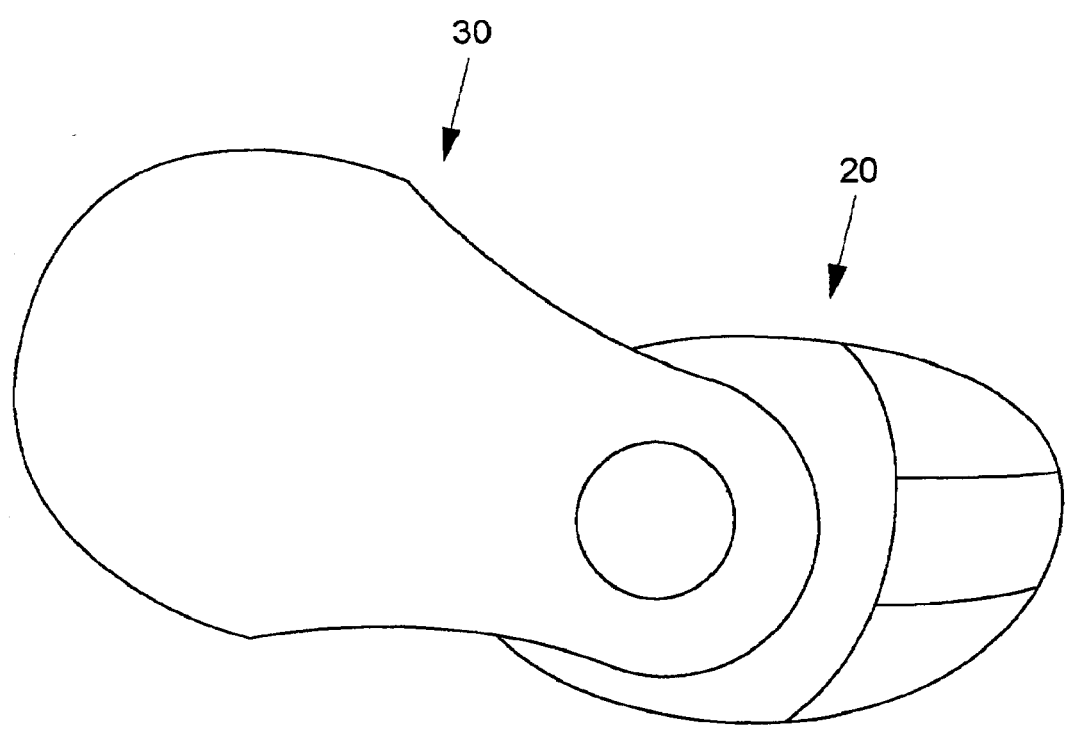
FIG. 15.

FIGS. 14 and 15 show how the hand rest 30 and the mouse housing 20 can rotate with respect to one another. As the mouse housing 20 and hand rest 30 rotate with respect to one another, the compression springs 420 and 450 are contorted about the connection pin 410 due to the engagement of top end 540 of the lower compression spring 450 with the engagement slot 240 of the top section 50 and the engagement of the bottom end of the upper compression spring 510 with the engagement slot 390 of the hand rest 30. During use of the ergonomic computer mouse 10, the torsional spring force of the compression springs 420 and 450 act to gradually resist movement of the mouse housing 20 and hand rest 30 with respect to one another giving the user of the ergonomic computer mouse 10 tactile feedback as to the movement of the mouse housing 20 with relation to the hand rest 30.

The claimed invention also comprises a new method of providing ergonomic support to the entire hand of a computer mouse user. Previously, computer mice have been designed to provide ergonomic support to the user's palm and fingers without regard to the positioning of the user's hand in relation to the user's wrist and arm during use of the computer mouse. The claimed invention provides a method of dynamically supporting the heel and palm of the user's hand during use to maintain the user's hand in a neutral position with relation to the user's wrist and arm thus reducing the risk of trauma to the user's hand, wrist and arm. The dynamic support of the heel and palm of the hand elevates the heel above the surface on which the ergonomic computer mouse is resting thus reducing the extension of the hand with relation to the wrist and elevating the knuckles of the hand above the top section of the mouse housing thus allowing manipulation of the mouse buttons with less flexion and extension of the fingers.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A computer mouse having a separately movable hand rest, the mouse comprising:

a computer mouse housing having a frustroconically shaped recess within a top wall of the mouse housing;

an aperture through the top wall of the housing centrally located within the frustroconically shaped recess;

a connecting pin extending through the aperture having an interior end secured within the mouse housing;

a hand rest sized and shaped to separately provide ergonomic support to the heel and palm of the hand of a user orbitally connected to the connecting pin by an aperture through the hand rest centrally located within a frustroconically shaped well sized and shaped to orbitally move within the recess of the mouse housing, the hand rest having an arcuate shaped bottom portion and a base end moving about the mouse housing during use to maintain alignment of the hand rest with the hand, the mouse housing moving free of interference from the hand rest adjacent the arcuate shaped bottom portion; and at least one tensioning means tensioning movement of the hand rest about the mouse housing.

2. The computer mouse of claim 1 further comprising:

an engagement slot within the well of the hand rest; and a retention plate adjacent the connecting pin retaining the tensioning means.

3. The computer mouse of claim 2 wherein the tensioning means comprises at least one spring about the connecting pin, a first end of the spring engaging the engagement slot.

4. The computer mouse of claim 3 further comprising a cover sized and shaped to cover the well, the cover covering the connection of the hand rest to the connecting pin.

5. A computer mouse having a separately movable hand rest, the mouse comprising:
- a computer mouse housing with a depression within a top wall of the housing having an aperture through the housing located within the depression;
- a connecting pin extending through the aperture having an interior end secured within the mouse housing;
- a hand rest having an arcuate shaped bottom portion with a concave connection portion sized smaller than the depression within the mouse housing orbitally connected to an exterior end of the connecting pin, the hand rest sized and shaped to separately provide ergonomic support to the hand of a user, a base end of the arcuate shaped bottom portion moving about the mouse housing during use to maintain alignment of the hand rest with the band;
- at least one tensioning means tensioning movement of the hand rest about the mouse housing; and
- a cover sized and shaped to cover the concave portion, the cover covering the connection of the hand rest to the connecting pin.

6. The computer mouse of claim 5 further comprising an engagement slot within, the concave-portion of the hand rest and a retention plate adjacent the connecting pin retaining the tensioning means.

7. The computer mouse of claim 6 wherein the tensioning means comprises at least one spring about the connecting pin, a first end of the spring engaging the engagement slot.

8. A computer mouse with separately movable hand rest, the computer mouse comprising:
- a computer mouse housing;
- a connecting pin extending through an aperture within a top wall of the mouse housing, the aperture having an engagement slot;
- a hand rest movably connected to the connecting pin for separate movement of the hand rest during operational use maintaining alignment of the hand rest with the hand, the hand rest having an arcuate shaped bottom portion so that the mouse may move free of interference from the hand rest adjacent the arcuate shaped bottom portion;
- a tensioning means tensioning movement of the hand rest about the computer mouse, the tensioning means retained by a retention plate adjacent the connecting pin.

9. The computer mouse of claim 8 wherein the tensioning means comprises at least one spring about the connecting pin, a first end of the spring engaging the engagement slot.

10. The computer mouse of claim 9 wherein the aperture is located within a depression of top wall of the mouse and the hand rest has a concave portion corresponding to the depression of the top wall.

11. The computer mouse of claim 10 further comprising a cover sized and shaped to cover the concave portion, the cover covering the connection of the hand rest to the connecting pin.

* * * * *